United States Patent [19]

Mentel

[11] Patent Number: 4,788,686
[45] Date of Patent: Nov. 29, 1988

[54] GAS-LASER ARRANGEMENT

[76] Inventor: Jürgen Mentel, Universitätsstrasse 150, Gebäude, IC-1, D-4630 Bochum 1, Fed. Rep. of Germany

[21] Appl. No.: 104,762

[22] Filed: Oct. 2, 1987

[30] Foreign Application Priority Data

Apr. 4, 1986 [DE] Fed. Rep. of Germany ....... 3611303

[51] Int. Cl.$^4$ .............................................. H01S 3/00
[52] U.S. Cl. ........................................ 372/37; 372/61; 372/69
[58] Field of Search .................. 378/37, 61, 69, 85, 378/87, 55, 70

[56] References Cited

U.S. PATENT DOCUMENTS

| | | | |
|---|---|---|---|
| 3,440,559 | 4/1969 | Lake et al. | 372/37 |
| 3,554,275 | 1/1971 | Schadi Jr. | 372/37 |
| 3,582,817 | 6/1971 | Gilson | 372/37 |
| 3,875,531 | 4/1975 | Buczek et al. | 372/37 |
| 4,044,315 | 8/1977 | Snitzer | 372/6 |
| 4,604,752 | 8/1986 | Sequin et al. | 372/37 |

Primary Examiner—Leon Scott, Jr.
Attorney, Agent, or Firm—Becker & Becker

[57] ABSTRACT

A gas-laser arrangement in which the laser medium is optically pumped. An arc or spark discharge is formed to a helix, particularly by an axial magnetic field. The volume surrounded by the helical arc or spark discharge is optically excited, unimpeded by a physical wall, by radiation from the discharge, especially in the vacuum-uv spectral region, or by resonance lines. Due to the temperature difference between the helical discharge and the gas column along the helix axis, an inversion may be produced in the vicinity of the axis by appropriate choice of gas and the gas composition.

11 Claims, 1 Drawing Sheet

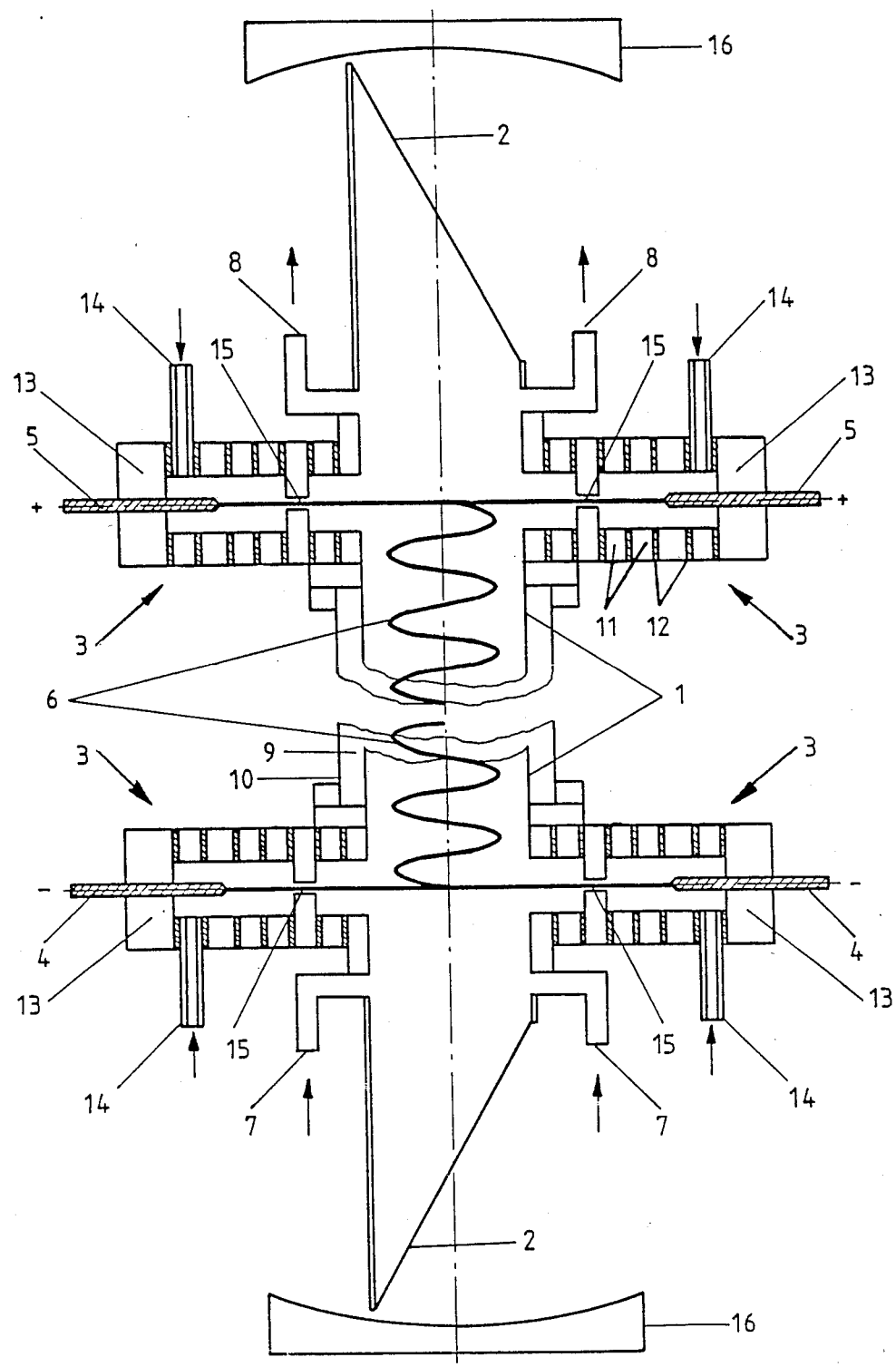

GAS-LASER ARRANGEMENT

BACKGROUND OF THE INVENTION

The present invention relates to a gas-laser arrangement, with a gaseous medium being optically pumped using an electric discharge, for example in a discharge chamber.

Arrangements and methods for optically pumping gas lasers are already known. As summarized, for example, in "Zeitschrift Laser and Optoelektronik", Vol. 16, p. 105 (1984), gaseous or vaporous dimers may be optically pumped with laser light that is irradiated from the outside into a gas cell. As shown by the example of an atomic iodine laser, a gas laser may also be pumped by an incoherent light source. The realization of a continuous-wave or cw-laser pumped with an arc lamp is presented in IEEE J. of Quantum Electronics, Vol. QE 20, p. 1187 (1984); the description of a pulsed iodine laser pumped by a flash lamp is given in the Springer Series Opt. Sci., Vol. 9, p. 142 (1978). The discharge tubes, in which the light sources are operated, can have a cylindrical or helical shape; in any case, they form a physical wall between the discharge and the gas volume.

From the specialized literature, for example from Z. Physik, Vol. 216, p. 33 (1968), and from Proc. IEEE, Vol. PS 1, p. 3 (1973), it can be seen that only a small amount of the radiation which is emitted in the interior of an arc discharge or a spark discharge escapes the discharge. Depending on the type of gas and the temperature in the discharge tube, the larger part of the radiation, especially the resonance radiation, is reabsorbed in the colder boundary layer of the discharge. In the case of rare gases and many other gases, the resonance radiation is emitted in the vacuum-uv (vuv) spectral region and is therefore reabsorbed, if not in the gas, in any case by the tube wall.

As a consequence, up to now vuv-radiation from discharges is not available for optical pumping. But vuv-radiation would be useful for many excitation processes, for example for the excitation of rare gases in order to operate a cw-excimer laser. Up to now the resonance radiation in spectral regions of longer wavelength can also not be practically used for efficient optical pumping since the major part of such radiation is reabsorbed in the interior of the light source.

It is therefore an object of the present invention to provide a gas-laser arrangement by means of which optical gain can be produced in a gaseous medium along a straight column with pump light of high intensity down to the vuv-region.

BRIEF DESCRIPTION OF THE DRAWING

This object, and other objects and advantages of the present invention, will appear more clearly from the following specification in conjunction with the accompanying schematic drawing, which illustrates one exemplary embodiment of the present invention.

SUMMARY OF THE INVENTION

The gas-laser arrangement of the present invention is characterized primarily in that the pump light source is shaped as a helical arc or spark discharge, the emitted radiation of which optically pumps the gas volume surrounded by the helical discharge without interposed physical walls.

To generate the helical arc or spark discharge, according to the invention a magnetic field may be applied parallel to the electrical field. The helical discharge may be operated in a cylindrical discharge tube, with the tube axis being parallel to the applied magnetic field.

If a discharge tube is provided, the arc discharge can assume a helical shape, with or without a magnetic field, by increasing the arc current and/or by increasing the gas pressure and/or by exciting an acoustic oscillation in the discharge tube.

It is known from the publication "Naturforschung", Vol. 26a, p. 526 (1971) that in a discharge tube the length of which is much larger than its diameter, a straight arc column transforms to a symmetrical helix if appropriate discharge parameters are chosen.

In addition to an arc helix with time independent amplitude in a discharge tube, a helix with fast growing amplitude may be produced by a spark discharge. This may be achieved by a magnetic field that is parallel to the electrical field. The volume surrounded by the spark may be pumped only for a short time in the case of a high power spark, but with high intensity and even with radiation of very short wavelength.

Pursuant to further advantageous refinements of the present invention, mixtures of rare gases and halogen gases come into consideration as a laser or pump medium. The vuv-radiation emitted from the arc core by the rare gases is reabsorbed in the volume surrounded by the helix, so that excited rare gas atoms are produced there. These form excimers with the halogen gases. Due to the much lower temperature on the helix axis in comparison to the discharge, at least a part of the excimers does not decay only by impact as in the arc core, but also by emission of radiation. Another version are molecular gases and vapors which in the arc are decomposed into their atomic components and emit the corresponding atomic spectra. By choosing appropriate lines of the atomic radiation, the molecular gas on the helix axis may be pumped selectively. Another similar possibility is offered by atoms and molecules which are ionized in the discharge core but not on the helix axis.

A further version uses demixing effects in the arc. By diffusion, gas additives having an ionization energy which is lower than that of the filling gas are extensively removed from the arc core, so that the radiation spectrum of the additives is emitted only with low intensity from the arc core. Such additives especially include metal vapors, which may be excited selectively by the radiation from the filling gas in the arc core.

A characteristic feature of the discharge volume according to the invention is its cylindersymmetric shape which should be as perfect as possible. To achieve this cylindersymmetric form, the electrodes are placed in lateral or side chambers or arms. For low power arcs, a tube of insulating, i.e. non-conductive, and temperature or heat resistant material, for example quartz or $Al_2O_3$, may be used as a vessel, and may be cooled by water or another coolant. For higher power arcs, a so called cascaded arc is recommended, in which case the discharge tube is composed of cooled metal plates that have a circular hole and are insulated from each other. The cooled plates are preferably made of copper. The end faces of the discharge tube are terminated by flat windows, preferably Brewster windows.

The advantage which may be achieved by this invention is that the volume surrounded by the helical discharge may be optically pumped, without interposed physical walls, by the radiation emitted from arc- or spark discharges, especially radiation in the vuv range. The same is true for resonance radiation in other spectral regions, which has only a short range in the discharge gas. It is possible in this way to optically pump with vuv-radiation, and to pump more efficiently with resonance radiation in spectral regions of longer wavelength. In this manner, gas lasers and optical amplifiers may be realized.

The special merit of the volume inside the helix is that the gas temperature is essentially lower than the temperature in the helical discharge. This is a prerequisite for efficient optical pumping. Moreover, the gradients of the density and the refractive index are small in the vicinity of the helix axis, and change their direction with the periodicity of the helix. In this way a deflection of the laser beam, which would occur at the rim of a cylindrical arc, is avoided.

A laser system formed according to the present invention is characterized by a comparably simple configuration because the design of arc discharge tubes is a known and developed technique from lamp manufacturing and spectroscopy. Extremely high demands for the vacuum tightness of the discharge tube are unnecessary since arc discharges are mostly operated at high pressure (typically atmospheric pressure), and a gas exchange may be performed at any time. All of the parts that are subjected to wear, e.g. electrodes and windows, may be exchanged at any time.

DESCRIPTION OF PREFERRED EMBODIMENTS

Referring now to the drawing in detail, shown in an axial section is a cylindrical discharge tube 1 that is terminated with Brewster windows 2 at the ends. Four side arms 3 are attached to the discharge tube 1, two for the cathodes 4 at one end, and two for the anodes 5 at the other end.

Inside the cylindrical tube 1, an arc 6 of helical shape is operated. The discharge tube 1 is equipped with gas inlets 7 and gas outlets 8. The discharge tube 1 comprises a tube of $Al_2O_3$, a material which is resistant to fluorine and many other aggressive media. Cooling water flows in the axial direction through an annular gap 9, which is formed by the discharge tube 1 and an outer tube 10. The cooling water is fed into the cooling system, not shown, of the side arms 3 for the cathodes 4, and flows off through the lateral arms 3 for the anodes 5. Via the gas inlets 7, the arc 6 is supplied with a steady flow of the aggressive component of the discharge gas, fluorine in the embodiment being described. Via the gas outlets 8, the gas mixture in which the arc is operated is withdrawn. The Brewster windows are made of sapphire discs.

The lateral or side arms 3 are composed of separate copper plates 11 that have a circular hole and are arranged one on top of the other in the axial direction. The plates are electrically insulated and simultaneously connected in a gastight manner with viton seals 12. As cathodes 4 and anodes 5, tungsten rods are used which are inserted centrally into the side arms 3 through end plates 13. At the inner side of each end plate 13 is a gas inlet 14 through which the inert component of the working gas, argon in the present embodiment, is introduced into the discharge tube 1 in a steady flow. The inert component is simultaneously used as protective gas for the cathodes 4 and anodes 5. A narrowed location 15 inside the cascaded side arms 3 prevents the aggressive component from entering the electrode spaces and destroying the cathodes 4 and anodes 5.

For high power arcs, the discharge tube 1 may be composed of cascaded plates in a similar way as the side arms 3.

At the cathodic and anodic ends of the discharge arrangement, the arc 6 is split into two partial arcs. This is achieved by separate and sufficiently high preresistances for each cathode 4 and each anode 5. The discharge is ignited or triggered in the inert gas atmosphere at reduced pressure by applying the operation voltage.

The discharge tube 1 is disposed in an axial magnetic field which may be produced, for example, by a coil, not shown, that is wound up on the outer tube 10. By varying of the magnetic field strength, the amplitude of the helically shaped arc 6 may be adjusted.

The axis of the discharge tube 1 is also the axis of an optical resonator that is formed by two laser mirrors 16.

The present invention is, of course, in no way restricted to the specific disclosure of the specification and drawing, but also encompasses any modifications within the scope of the appended claims.

What I claim is:

1. A gas-laser arrangement, with a gaseous medium being optically pumped, unimpeded by physical walls and using an arc or spark discharge, said arrangement comprising:
   a pumplight source in the form of a helical arc or spark discharge, being produced by a magnetic field which exerts magnetic forces on a discharge current and radiation from said pumplight source pumping a gas volume surrounded by a discharge chamber along a helical axis parallel to said magnetic field corresponding to an axis of an optical resonator.

2. A gas-laser arrangement according to claim 1, wherein said helical discharge produced by said magnetic field is produced via a coil parallel to an electrical field and applied in a direction along the axis of the optical resonator.

3. A gas-laser arrangement according to claim 1, which includes a cylindrical discharge tube with an axis parallel to the axis of the optical resonator and in which said arc discharge takes on a helical shape manner manner due to: an increase of the arc current, by an increase of pressure in said tube, and by an excitation of an acoustical oscillation in said cylindrical discharge tube.

4. A gas-laser arrangement according to claim 1, which includes a discharge tube in which said helical discharge is operated containing one of the following: an excimer-gas mixture, molecular gases which are dissociated inside the helical discharge due to a higher temperature therein, atoms or molecules that are ionized inside the helical discharge due to a higher temperature therein, and additives such as metal vapors having an ionization energy below that of a filling gas, as a result of which the concentration of such vapor or additives in said helical discharge is greatly reduced.

5. A gas-laser arrangement according to claim 1, which includes a cylindrical tube that forms a discharge volume, said tube having ends that are provided with windows, and electrode-equipped side arms are attached at said tube.

6. A gas-laser arrangement according to claim 5, in which said windows are Brewster windows.

7. A gas-laser arrangement according to claim 5, in which said tube is made of a non-conductive, heat-resistant material.

8. A gas-laser arrangement according to claim 7, in which said material is selected from the group consisting of quartz and $Al_2O_3$.

9. A gas-laser arrangement according to claim 5, in which said tube comprises cascade plates that are insulated from one another and have a circular hole.

10. A gas-laser arrangement according to claim 9, in which said cascade plates are metal plates.

11. A gas-laser arrangement according to claim 10, in which said plates are copper plates.

* * * * *